Jan. 25, 1966  W. J. McMILLAN  3,231,231
CASTING APPARATUS
Filed June 3, 1963
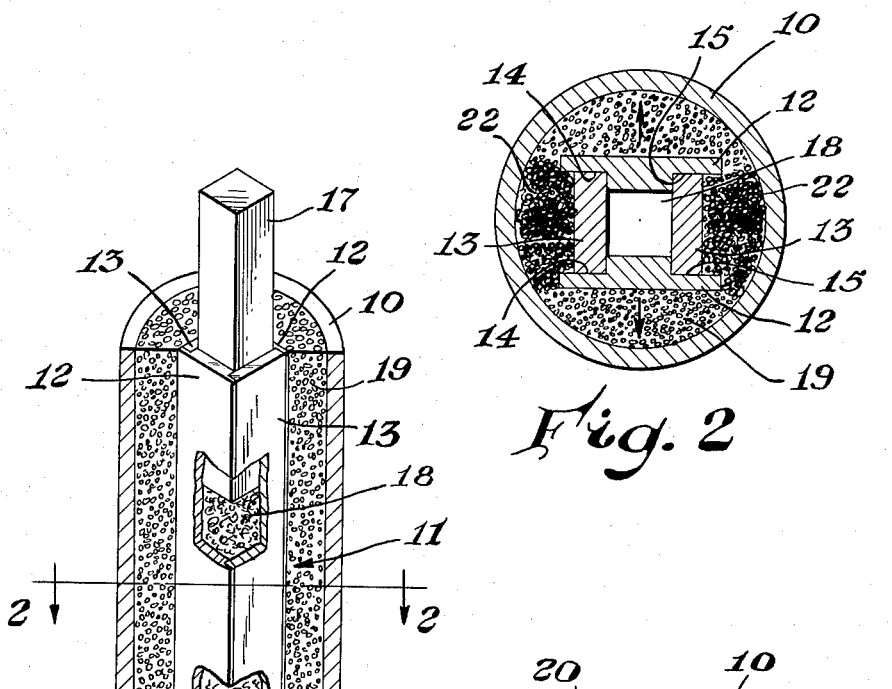
Fig. 1
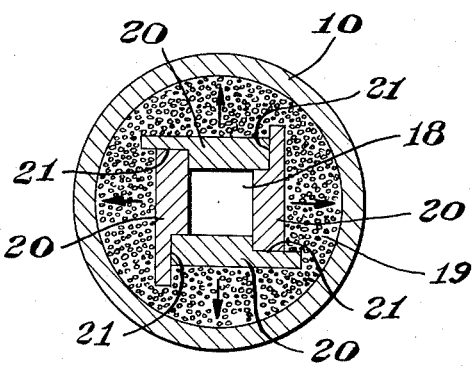
Fig. 2
Fig. 3
INVENTOR.
William J. McMillan
BY
Griswold & Burdick
ATTORNEYS United States Patent Office 3,231,231
Patented Jan. 25, 1966

3,231,231
CASTING APPARATUS
William J. McMillan, Midland, Mich., assignor to The Dow Chemical Company, Midland, Mich., a corporation of Delaware
Filed June 3, 1963, Ser. No. 285,016
10 Claims. (Cl. 249—82)

This invention relates to casting and more particularly relates to a casting apparatus used in the molding and foaming of articles of multicellular glass forming material.

The term, glass-forming material, as used herein refers to foamable and foamed vitreous materials which contain at least about 50% silicon dioxide with the remainder composed essentially of one or more glass forming substances such as, for example, boric oxide, phosphorous pentoxide and germanium oxide, and the like, and/or minor amounts of one or more glass modifiers such as, for example, potassium oxide, sodium oxide, calcium oxide, magnesium oxide, and the like.

In molding vitreous or multicellular glass forming material such, for example, foamed silica or foamable silica beads, mold temperatures of from about 1400° C. to about 1800° C. are normally required. At these temperatures expansion of the mold used is considerable, whether the apparatus is made of, for example, graphite or some other refractory type material. Therefore, upon having completely filled the mold cavity, and allowing the mold to cool it begins to contract to the same extent as it expanded when heated. The foamed silica, however, which has a lower coefficient of expansion than the materials from which the mold would normally be constructed, such as the materials mentioned above, correspondingly contracts very little. Depending, then, on which has the greater structural strength, either the mold or the cast article in it may crack or be broken, thereby resulting in a great loss of product, time, and expense. There exists in the art, then, a need for a casting apparatus whereby multicellular glass articles such as foamed silica and other foamable articles may be prepared without risk of damage to or destruction of either the mold or foamed article formed therein, or both, due to the difference in the thermal expansion and contraction of the mold and article therein cast.

An object of the present invention, therefore, is to provide a casting apparatus used in the molding and foaming of multicellular articles whereby such articles may be prepared without risk of damage to or destruction of either the mold or the article by thermal expansion or contraction.

Other related objects and advantages of the present invention will become apparent from the following description with reference to the drawings in which:

FIGURE 1 is a partially sectioned and cutaway isometric view of one embodiment of the casting apparatus of the present invention showing the mold walls positioned in a crucible with loose granular material filling the space between said mold walls and crucible.

FIGURE 2 is a cross-sectional view taken along line 2—2 of FIGURE 1 showing in detail the arrangement of the mold sides of the mold portion of the apparatus of FIGURE 1 including a variation in granule density around said sides.

FIGURE 3 is a similar cross-sectional view to that of FIGURE 2 showing a modification of the mold sides of the mold portion of the apparatus of FIGURE 1.

Generally, the casting apparatus of the present invention comprises a crucible portion, and a mold portion which consists of a plurality of four or more independent sides, the vertical long edges of which mate, such that when the sides, with a base, are assembled in the crucible portion to form a mold cavity, inward movement and collapse is prevented, but outward transverse movement is permitted. In addition, an expansion absorbing and controlling means or medium is provided between the mold portion and the crucible portion such that the sides of the mold portion are urged to maintain their relative assembled positions. By employing the above independently movable sides the effect of expansion and contraction of the mold and article cast therein is thereby controlled to prevent damage to or destruction of either the mold or article, or both.

Referring now to FIGURES 1 and 2, one embodiment of the casting apparatus of the present invention is given therein showing a crucible portion 10 housing a mold assembly portion, said mold portion being indicated generally by numeral 11. The mold assembly portion comprises four rectangular independently movable sides 12 and 13 and a rectangular base 16. Two of the rectangular sides 12, being opposite each other, are rabbeted along their inner opposite vertical edges to provide recesses 14 and 15 to receive the edges of the other two opposite sides 13, thereby making a rabbeted joint at the long vertical edges of each side. The rectangular base 16 fits into the inside of the bottom of the assembled mold sides, and against said sides. A slidable top 17, weighted, if desired, having a rectangular external cross section such that it fits into and against the inner surface of the aforementioned assembled sides closes the mold cavity 18 formed by said sides 12 and 13 and base 16. Said top being slidable, it is, therefore, capable of moving longitudinally along the longitudinal axis of the mold assembly, depending on the weight of the top and expansion of the material being cast in the mold cavity 18, defined by the inner surfaces of the sides 12 and 13, end 16 and top 17, during the molding operation, as will hereinafter be described. The mold sides are surrounded by a layer of compressible granules 19, for example, coke granules, contained in the crucible portion 10, which serve not only to press against the sides 12 and 13 of the mold, thereby holding them together, but also to absorb the expansion of both the sides and the material being cast during heating of the casting apparatus. The granule size, though it may be larger depending on the size of the casting apparatus, is generally from about $\frac{1}{16}$ inch to $\frac{1}{2}$ inch in diameter at its greatest cross-section, preferably about $\frac{3}{16}$ inch in diameter.

The crucible 10 portion of the mold assembly of the present invention constitutes a heatable continuous wall vessel type container which may be either open, as shown in FIGURE 1, or closed with a closure, not shown, which, for example, could be a block having the cross-sectional shape of that of the crucible provided with a rectangular opening to accommodate the rectangular shape top 17.

In the modification of the casting apparatus as shown in FIGURE 3, the mold sides comprise a plurality of common rectangular panels 20, each panel having one of its long vertical edges rabbeted to provide a recess 21 into which the unrabbeted edge of an adjacent panel fits, thereby providing a mold cavity with a rectangular cross section similar to the cavity of FIGURE 2. In this arrangement the panels 20 are thereby prevented from moving inwardly toward each other beyond the limits of the recesses but on the other hand, are allowed a four-way outward expansion, as indicated by the arrows in FIGURE 3 being limited, however, in said outward expansion by the compressible layer 19 such that the long edges of the mold panels 20 do not part beyond their recesses as the material being molded for foamed expands.

Normally, the mold sides are designed such as to form either a square or rectangular cross-sectional mold cavity. However, the sides may also be designed to provide other cross-sectional cavity configurations provided they are not too intricate to prevent the foamed articles produced therein to be successfully removed from the casting apparatus without breaking.

Small flanges or ribs that may result from the material expanding into the little open areas at the rabbeted joints of the sides caused by the moving of said sides outwardly may be removed, for example, by a grinding or cutting operation subsequent to molding or foaming.

In general, the mold base may either be a flat plate placed to close off the cavity formed by the assembled mold sides on which said sides would sit and move outwardly, or, it may be a slidable plug type base 16, as shown in FIGURE 1, around and against which the mold sides abut. Though a mold top is normally used and is weighted to sufficiently control the upward degree of expansion of the material in the mold cavity being treated, it may, however, be eliminated if preferential expansion in one direction (upward) is desired.

Inasmuch as molding of foaming of silica, for example, is accomplished at temperatures of from about 1400° C. to about 1800° C., the casting apparatus regardless of design must be constructed of a material sufficient to structurally withstand such temperatures and also be resistant to oxidation at said temperature. If, however, inert atmospheres, such as, for example, helium or argon, are employed during the casting operation, materials which are less resistant to oxidation may be employed.

Suitable materials from which to construct the casting apparatus of the present invention may be, for example, graphite or a refractory oxide, nitride, carbide, or silicide, depending on the material to be molded, temperature, and the atmosphere in or about the casting apparatus during the mold operation. Such materials may also be employed in granular form to constitute the aforementioned compressible granule layer located between the crucible 10 and mold assembly 11. Coke granules, however, are preferred. In addition, for glass forming materials which do not require molding temperatures exceeding about 1200° C., as stated above, the casting apparatus of the present invention may be constructed of high temperature oxidation resistant stainless steel such as, for example, number 304 or 316 stainless steel. By so-employing said stainless steel, molding in inert atmosphere to avoid destructive oxidation of the casting apparatus will not be required.

Although only one mold assembly is shown in the crucible portion 10 of the casting apparatus, it is manifest that one or more molds may be used in one crucible if desired, provided, however, that in the case where multiple molds are employed, the crucible can be heated to adequately provide the temperatures needed to mold or foam the particular material being employed in making the desired cast article. In addition, whether one or more molds are employed, a crucible wall thickness sufficient to withstand the strain caused by the expanding mold assembly and contents thereof, as transmitted transversely against the internal crucible wall by the aforementioned granules, is necessary.

In practicing the embodiment of the present invention as shown in FIGURES 1 and 2, mold sides 12 and 13 are assembled in the crucible portion 10, as described above, on the mold base 16 and the coke granules 19, poured in the area between the internal crucible wall and the outer walls of the mold sides 12 and 13, up to the top of said sides, to form a compressible layer thereof.

Previous to charging the cavity formed by assembling the sides and base, the surfaces of the cavity which are to contact the cast piece are preferably coated with a release agent, that is, a material or composition which will prevent sticking of the cast article to said surfaces. Without the use of such an agent the cast piece tends to stick to the mold walls making it difficult to remove said cast piece from the mold cavity. Such a releasing agent, for example, may be a silicon carbide slurry in methanol, which can be simply applied using a brush to completely cover the appropriate surfaces with said mixture.

The material 23 to be molded or foamed is then charged into the cavity 18 formed by said mold sides and base, and the top 17 placed in position. The entire casting apparatus is then placed in an oven, not shown, preferably on supports to obtain uniform circulation of the hot air or inert gas in the oven, and heated either at atmospheric or under a partial vacuum to the temperature required to mold or foam the material charged into the mold cavity, or, where the crucible is a suitable suseptor, induction heating may be used. In addition, the casting apparatus may also be heated by direct means as by a plurality of gas jet flames against the outer crucible wall. Care must be taken in this latter method, however, so that heating is substantially uniform in order to avoid damage to the apparatus due to possible non-uniform heating of the apparatus. Non-uniform heating tends to produce a cast article which is not homogenous with respect to density.

Upon heating, the material to be molded expands to press the mold sides 12 and 13 against the compressible coke granule layer 19. In addition, the mold top 17 also moves outwardly (upward) as said material expands depending on the weight thereof. After the charge has expanded to the degree desired and planned for, as limited by the recesses of the mold sides and granule density in the crucible, the casting apparatus is removed from the oven and allowed to cool. Upon cooling, since the mold sides do not form a continuous mold wall, but are independently movable, contraction of said mold sides does not exert a compressive effect on the expanded foamed article to break or damage it, but yet said mold walls provide a yielding surface during heating against which the expanding material molds itself into said article. The granules and mold sides are then removed in that order from the crucible followed by the cast foamed article.

As aforesaid, the casting apparatus during the casting operation while heating may either be maintained at atmospheric pressure or under a partial vacuum to facilitate foaming of foamable materials which have less of a tendency to foam without the presence of a blowing agent, such as, for example, carbon black (finely divided carbon). Blowing agents such as carbon promote foaming by forming gas bubbles under heat in the material to be foamed thereby expanding the material into a vitreous mass.

If desired, expansion of the material to be molded or foamed can be directionally controlled. This is accomplished by restricting expansion of said material, for instance, to one or more directions. For example, referring to FIGURE 2, expansion of the charge may be restricted to two directions rather than 4, or 5 if the charge had been allowed to expand upwardly, by establishing a more dense layer 22 of granules on the side or sides in which expansion is to be limited, and by weighting the mold top 17 so as to restrict expansion upwardly. In so doing, expansion of the charge material is limited in two directions (as shown by the arrows in FIGURE 2).

In controlling the directions of expansion, molded articles having density gradients may be produced. In addition, by employing both foamable beads and partially prefoamed granules, foamed articles, such as, for example, panels having a high density skin and low density core, may be produced.

It is to be understood that the present invention is not intended to be restricted to the embodiments thereof as described above and as shown in the accompanying drawings, but can be changed and modified by those skilled in the art within the scope and substance of the invention. In addition, though the invention has been described generally in terms of casting foamable and prefoamed silica type beads or granules, or a mixture thereof, the apparatus of the present invention is also applicable to other types of multicellular foamable or prefoamed castable materials which, due to the aforementioned problems concerning expansion and contraction, lend themselves to use with the apparatus.

The following examples serve to further illustrate the present invention.

*Example 1*

About 47 grams of fuzed foamable silica beads, said beads comprising about 99.6% by weight silicon dioxide and about 0.1% lamp black (carbon), the balance being other oxides as impurities, having a mesh distribution such that about 85 percent of said granules passed through a number 10 screen, but retained on a number 16 screen (U.S. Standard Sieve Series), were placed in the rectangular mold cavity of a casting apparatus assembled and constructed in accordance with the present invention, the inner walls of the mold assembly having been treated to prevent sticking by the product to said walls. As materials of construction, graphite was used throughout with coke granules as the compressible layer thereof between the crucible portion and the mold assembly portion thereof. The so-charged casting apparatus was then heated in a nitrogen atmosphere for about one hour at about 1675° C. The apparatus was allowed to cool and then was disassembled by removing the coke granules, mold top and sides. Thereupon, the now-foamed silica product was removed from the casting apparatus as an unbroken or undamaged article having a homogenous cell structure, and a smooth surface, with dimensions of 1.175 inches by 1.168 inches by 4.32 inches and a density of about 27 pounds per cubic foot. Upon visual examination of the casting apparatus, no part thereof was broken or cracked due to any effects of expansion or contraction during the above heating and subsequent cooling of said apparatus.

*Example 2*

About 60 grams of a mixed silica material containing about 75 percent by weight prefoamed granules having a bulk density of about 22 pounds per cubic foot, the balance being unfoamed silica beads of the type used in Example 1, were introduced into the mold cavity of the casting apparatus described in the above example. The apparatus was then placed in an oven and heated for ½ hour at a temperature of about 1650° C. After removing said apparatus from the oven and allowing it to cool to room temperature, the apparatus was dissambled and the foamed silica article removed, which was found to have an apparent density of about 32 pounds per cubic foot. Neither the casting apparatus, nor the foamed article produced therein, was broken, damaged, or cracked.

*Comparative example*

By way of comparison with Examples 1 and 2, a graphite continuous wall mold having a base and a cavity dimension of 4 x 1⅛ x 1⅛ inches, the inner wall and base surfaces having been coated with silicon carbide as a releasing agent, was charged with about 35 grams of the type foamable silica granules used in Example 1 above. The so-charged mold was then fitted with a top to contain the expandable material and placed in an oven whereupon the mold was heated to 1650° C. for a period of about 10 minutes, during which the silica foamed and filled the mold. After having removed the mold from the oven and upon cooling it, the mold ruptured along its entire 4-inch length due to the greater thermal contraction of the graphite mold than that of the foamed silica therein. In addition, as a result, the cast silica article also cracked.

As illustrated by Examples 1 and 2, however, when using the casting apparatus of the present invention to mold silica articles, for example, unlike the comparative example, neither the mold nor the article cast therein was damaged or broken due to thermal expansion and contraction.

I claim:

1. A casting apparatus for molding glass forming materials which comprises, a crucible portion and a mold assembly portion, said mold portion being contained within the crucible portion and comprising a plurality of independently movable sides having straight vertical edges one of which mates with a groove in the other such that when the sides are assembled in the crucible portion in edge to edge relationship, they form a box-like enclosure to form a mold cavity, and inward movement of the sides is prevented but outward transverse movement is permitted, a base closing the bottom opening of said cavity formed by the mold sides, and an expansion absorbing and controlling means located between the mold portion and the crucible portion urging the mold sides together to maintain their relative assembled positions prior to casting.

2. The apparatus of claim 1 wherein, the mold assembly portion is equipped with a top.

3. The casting apparatus of claim 1 wherein, said apparatus is constructed of a refractory material.

4. The casting apparatus of claim 1 wherein, the expansion absorbing and controlling means comprises a granulated refractory.

5. The casting apparatus of claim 1 wherein, said apparatus is constructed of graphite.

6. The casting apparatus of claim 1 wherein, said apparatus is constructed of high temperature, oxidation resistant stainless steel.

7. The casting apparatus of claim 1 wherein, the expansion absorbing and controlling means comprises a granulated coke.

8. The casting apparatus of claim 3 wherein, said refractory is a material selected from the group consisting of a refractory oxide, nitride, carbide, boride, and silicide.

9. The casting apparatus of claim 1 wherein, the mold assembly portion comprises, a base, and four rectangular independently movable sides, two of said sides, opposite each other, being rabbeted along their inner opposite vertical edges to provide a recess on each said edge, the vertical edges of the two opposite sides joining the rabbeted edged sides, thereby making rabbeted joints between all four sides and with one another to form a mold cavity.

10. The casting apparatus of claim 1 wherein, the mold assembly portion comprises, a base and a plurality of common rectangular panels, each panel having one of its vertical edges rabbeted to provide a recess such that the unrabbeted vertical edge of an adjoining panel fits thereinto to form a mold cavity.

References Cited by the Examiner

UNITED STATES PATENTS

| | | | |
|---|---|---|---|
| 1,829,114 | 10/1931 | Schroeder | 249—112 |
| 2,241,386 | 5/1941 | Benner et al. | 249—62 |
| 2,705,851 | 4/1955 | Duerr | 249—106 |
| 2,937,476 | 5/1960 | Davies | 24—62 |

DONALL H. SYLVESTER, *Primary Examiner.*